United States Patent
Matsuzawa et al.

(10) Patent No.: US 7,529,892 B2
(45) Date of Patent: May 5, 2009

(54) FILE READAHEAD METHOD WITH THE USE OF ACCESS PATTERN INFORMATION ATTACHED TO METADATA

(75) Inventors: Keiichi Matsuzawa, Yokohama (JP); Takaki Nakamura, Ebina (JP); Koji Sonoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 11/541,692

(22) Filed: Oct. 3, 2006

(65) Prior Publication Data

US 2008/0040538 A1 Feb. 14, 2008

(30) Foreign Application Priority Data

Aug. 10, 2006 (JP) ............................. 2006-217938

(51) Int. Cl.
*G06F 12/00* (2006.01)

(52) U.S. Cl. .................. 711/137; 711/113; 711/154

(58) Field of Classification Search ............... 711/137, 711/118, 170, 113, 154
See application file for complete search history.

(56) References Cited

U.S. PATENT DOCUMENTS

2005/0114608 A1 5/2005 Oshima et al.
2005/0192980 A1* 9/2005 Matsunami et al. ......... 707/100
2006/0045475 A1* 3/2006 Watanabe et al. ............. 386/69
2006/0277226 A1* 12/2006 Chikusa et al. ............. 707/201

FOREIGN PATENT DOCUMENTS

| JP | 6482239 | 3/1989 |
|----|---------|--------|
| JP | 2001-256099 | 9/2001 |
| JP | 2005-157711 | 6/2005 |

\* cited by examiner

*Primary Examiner*—Hyung S Sough
*Assistant Examiner*—Mehdi Namazi
(74) *Attorney, Agent, or Firm*—Brundidge & Stanger, P.C.

(57) ABSTRACT

Provided is a computer system containing plural storage systems which manages the bandwidth of the storage systems in accordance with storage area attributes. The computer system is characterized in that: a control unit incorporates related file information in metadata, the related file information containing information for identifying a second file which to be write-accessed in conjunction with access to a first file by a client computer, and an access type of the write access. The control unit refers to the related file information to obtain the second file and the access type when the first file is accessed by the client computer. The control unit reads, from the obtained second file stored in the disk device, data corresponding to the obtained access type, to store the read data in a cache memory.

9 Claims, 11 Drawing Sheets

| FILE ID | ACCESS PATTERN | ACCESS FREQUENCY | READAHEAD POINT | ACCESS COUNT |
|---|---|---|---|---|
| access.log | append write | 100% | TAIL END | HIGH |
| config | sequential read | 100% | HEAD | HIGH |
| error.log | append write | 30% | TAIL END | 1 |
| database | partial R/W | 10% | 5KB | 1 |

RELATED FILE INFORMATION

```
<head>

<link rel= "stylesheet"  type= "text/css"  href = " mystyle.css ">
<script type= "text/javascript" src= " test.js " >

</head>
<html>
<body  bground = " wallpaper.png ">

HERE ARE PICTURES OF THE TRIP
<img  src = " photo1. Jpg " >
<img  src = " photo2. Jpg " >
<img  src = " photo3. Jpg " >

<a href = " page2. Html " > NEXT PAGE </a>
<a href = " index. Html " > INDEX </a>

</ body >
</ html >
```

FIG. 7

| | 310 | 330 | 350 |
|---|---|---|---|
| | FILE NAME | ACCESS FREQUENCY | ACCESS COUNT |
| 940 | mystyle.css | 90% | HIGH |
| 950 | test.js | 90% | HIGH |
| 960 | wallpaper.png | 90% | HIGH |
| 970 | photo1.jpg | 70% | LOW |
| 980 | photo2.jpg | 70% | LOW |
| 990 | photo3.jpg | 70% | LOW |
| 1000 | page2.html | 10% | LOW |
| 1010 | index.html | 30% | MEDIUM |

300

RELATED FILE INFORMATION TABLE

|  1110  |  1120  |  1170  |  1180  |
| :---: | :---: | :---: | :---: |
| ACCESS TIME | FILE NAME | ACCESS PATTERN | ACCESSED POINT |
| [28/Dec/2005:09:50:00] | page.html | Sequential Read | HEAD |
| [28/Dec/2005:09:50:01] | mystyle.css | Sequential Read | HEAD |
| [28/Dec/2005:09:50:01] | test.js | Sequential Read | HEAD |
| [28/Dec/2005:09:50:01] | wallpaper.png | Sequential Read | HEAD |
| [28/Dec/2005:10:00:00] | page1.html | Sequential Read | HEAD |
| [28/Dec/2005:10:00:01] | mystyle.css | Sequential Read | HEAD |
| [28/Dec/2005:10:00:01] | test.js | Sequential Read | HEAD |
| [28/Dec/2005:10:00:01] | wallpaper.png | Sequential Read | HEAD |
| [28/Dec/2005:10:00:02] | photo1.jpg | Sequential Read | HEAD |
| [28/Dec/2005:10:00:02] | photo2.jpg | Sequential Read | HEAD |
| [28/Dec/2005:10:00:02] | photo3.jpg | Sequential Read | HEAD |
| [28/Dec/2005:10:00:10] | page2.html | Sequential Read | HEAD |

ACCESS LOG 1100

FILE READAHEAD METHOD WITH THE USE OF ACCESS PATTERN INFORMATION ATTACHED TO METADATA

CLAIM OF PRIORITY

The present application claims priority from Japanese patent application 2006-217938 filed on Aug. 10, 2006, the content of which is hereby incorporated by reference into this application.

BACKGROUND

This invention relates to a file server for storing files accessed by a computer and a method by which the file server reads information ahead out of a disk drive.

File readahead is known as a technology for improving the data transfer rate of a file system. File readahead speeds up a response to a user's file offset request by reading target data out of a low-speed disk drive into a cache memory before a user issues a file offset request and thus eliminating a need to access the disk drive upon reception of the file offset request (refer to JP 01-082239 A).

Also known is a technique of reading ahead, upon reception of a file offset request, a file that is not the requested file. For example, an access controller is known which controls access as follows. A file server 100 reads a head part DH of a multimedia file D to a RAM 34 prior to reception of a data transmission request. When the multimedia file D is to be sent in response to a data transmission request received, in a case where the head part DH of the multimedia file D requested by the data transmission request has already been read to the RAM 34, the head part DH in the RAM 34 is sent out and, concurrently with this transmission operation, the remainder of the multimedia file D requested by the data transmission request is read out of a storage system 42 (refer to JP 2001-256099 A).

This and similar techniques enable a file system to process data read ahead to a cache memory in the case of sequential read where plural files are read in order, thereby eliminating a need to wait for a response from a disk drive and shortening response time.

A readahead method based on access history is also known. In an environment assumed in this method, data read is requested by other computers through a network interface. A storage system stores, in a table, statistical information composed of IDs of computers that have sent data reference requests and access history. When a data read request is issued, the storage system searches the statistical information table for an entry holding the ID of a computer that is the sender of the request, and reads ahead data at a point recorded in the entry (refer to US 2005/0114608 A1).

SUMMARY

With conventional readahead techniques as the one in JP 01-082239 A described above, data of an individual file is read ahead but not other files than the one to which access is requested. This brings little advantage of readahead to a user who refers to plural files in succession.

To solve this problem, JP 2001-256099 A accomplishes readahead across different files by making the file server store an access history table in the disk drive and determine which file is to be read ahead based on information in the table. However, in a file system that stores a huge amount of files, the size of the access history table becomes larger in proportion to the file count, and the action of the file server to refer to the access history table requires itself to access disks. This increases the disk access count, particularly in a high-load environment, which is the opposite of the intended effect, and may lower the performance.

Any of the file readahead techniques described above is for improving the response performance to read requests made to a storage system. A storage system in general reads and writes data on a block basis, and therefore stores blocks of a file to be read ahead in a cache memory in order starting from a head block. However, not all write requests include the head block of a file as one of blocks to be written, and it is necessary to read all blocks of a file to a cache in advance. As a result, file readahead may not function effectively for a large-sized file which has many blocks.

This invention has been made to solve these problems, and it is therefore an object of this invention to provide a file system capable of determining which file is to be read ahead without allowing disk access to increase in proportion to the file count, and thus performing efficient readahead for data write in a storage system as well.

A aspect of this invention is characterized in that: a file server, comprising: a control unit; a cache memory for temporarily storing data accessed by a client computer; an interface coupled to the client computer; and an interface coupled to a disk device, for managing a file stored in the disk device and metadata being information capable of identifying the file. The control unit incorporates, into the metadata, related file information containing information for identifying a second file to be write-accessed in conjunction with access to a first file by the client computer, and an access type of the write access. The control unit refers to the related file information to obtain the second file and the access type when the first file is accessed by the client computer. The control unit reads, from the obtained second file stored in the disk device, data corresponding to the obtained access type, to store the read data in the cache memory.

This invention provides an effect of improving the file read/write performance when plural files are accessed repeatedly in similar patterns, without needing to refer to information that is contained in another block of a disk drive.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

An embodiment of this invention will be described below with reference to the accompanying drawings.

Figure 1:
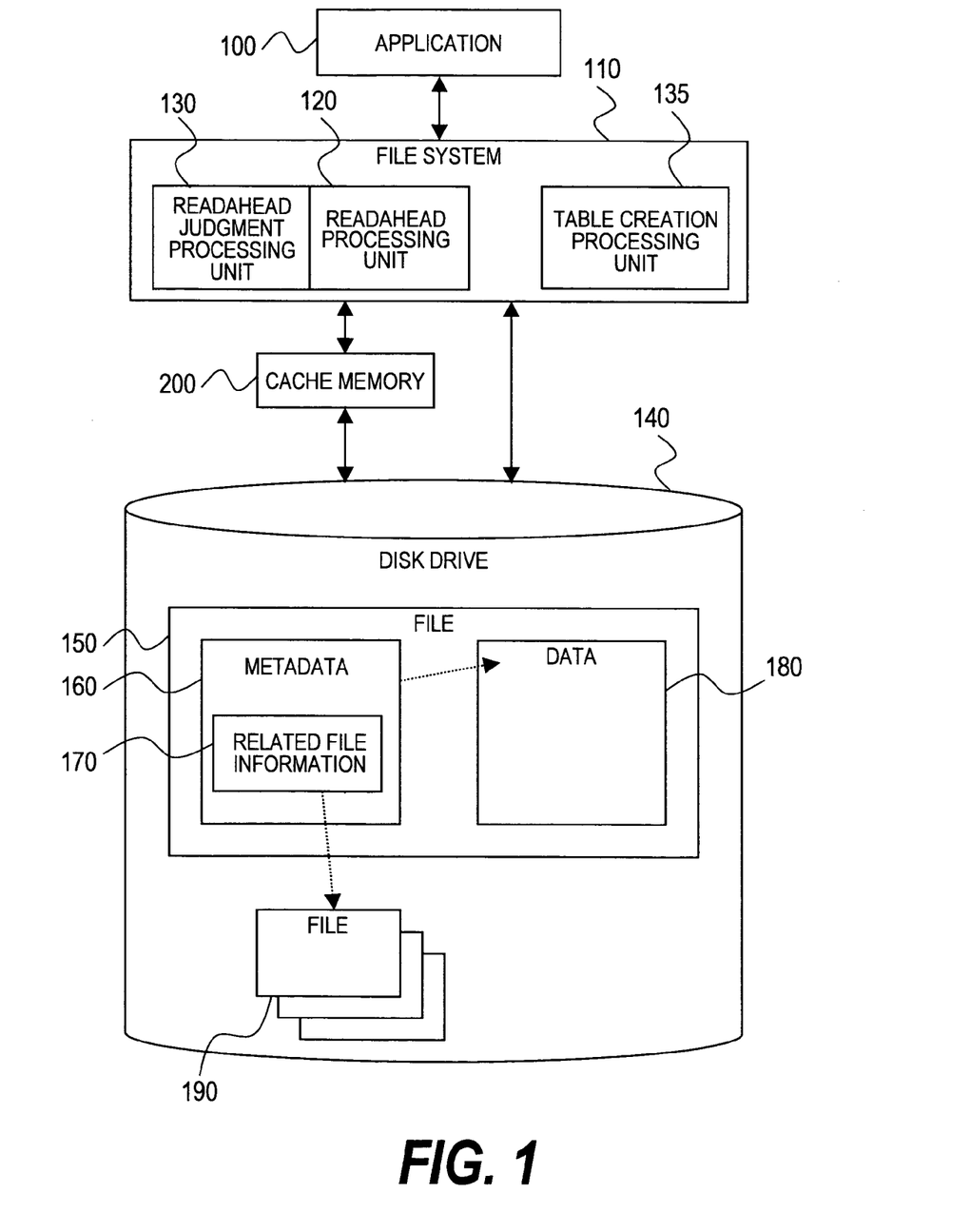
FIG. 1 is a function block diagram showing an outline of a computer system according to an embodiment of this invention.

FIG. 1 is a function block diagram showing the outline of a computer system according to an embodiment of this invention.

The computer system shown in FIG. 1 is composed of a file system 110, a disk drive 140, a cache memory 200 and an application 100, which refers to files in the file system 110.

The application 100 requests the file system 110 to perform a file operation such as file input/output. The file system 110 operates on files stored in the disk drive 140 as requested by the application 100. The disk drive 140 stores files. The file system 110 is connected in a manner that allows the file system 110 to intercommunicate with the disk drive 140 and the cache memory 200.

The file system 110 has a readahead processing unit 120, a readahead judgment processing unit 130 and a table creation processing unit 135. The file system 110 refers to data stored in the disk drive 140 to meet a request issued by the application 100. The file system 110 stores, temporarily, in the cache memory 200, data read out of the disk drive 140 and data to be written in the disk drive 140. When requested data is temporarily stored in the cache memory 200, the readahead processing unit 120 and the readahead judgment processing unit 130 read ahead data that is related to the requested data and stores the related data in the cache memory 200.

The table creation processing unit 135 creates related file information 170 for a file 150, and stores the information in the disk drive 140. Alternatively, the related file information 170 may be created by other components than the file system 110, for example, by the application 100, to be received and stored in the disk drive 140 by the table creation processing unit 135.

The disk drive 140 stores the file 150 managed by the file system 110. Magnetic disk drives, for example, can be employed for the disk drive 140. The disk drive 140 may be built from one magnetic disk drive or from a disk array including plural magnetic disk drives. Flash memories may be employed instead of magnetic disk drives.

The file 150 contains metadata 160, which shows file configuration information, and data 170, which shows information of the file. The metadata 160 contains information indicating which block in the disk drive 140 stores data 180. The metadata 160 also contains the related file information 170, information about a file 190 which might be accessed immediately after access to the file 150. The related file information 170 contains a related file information table 300 shown in FIG. 3.

Figure 2:
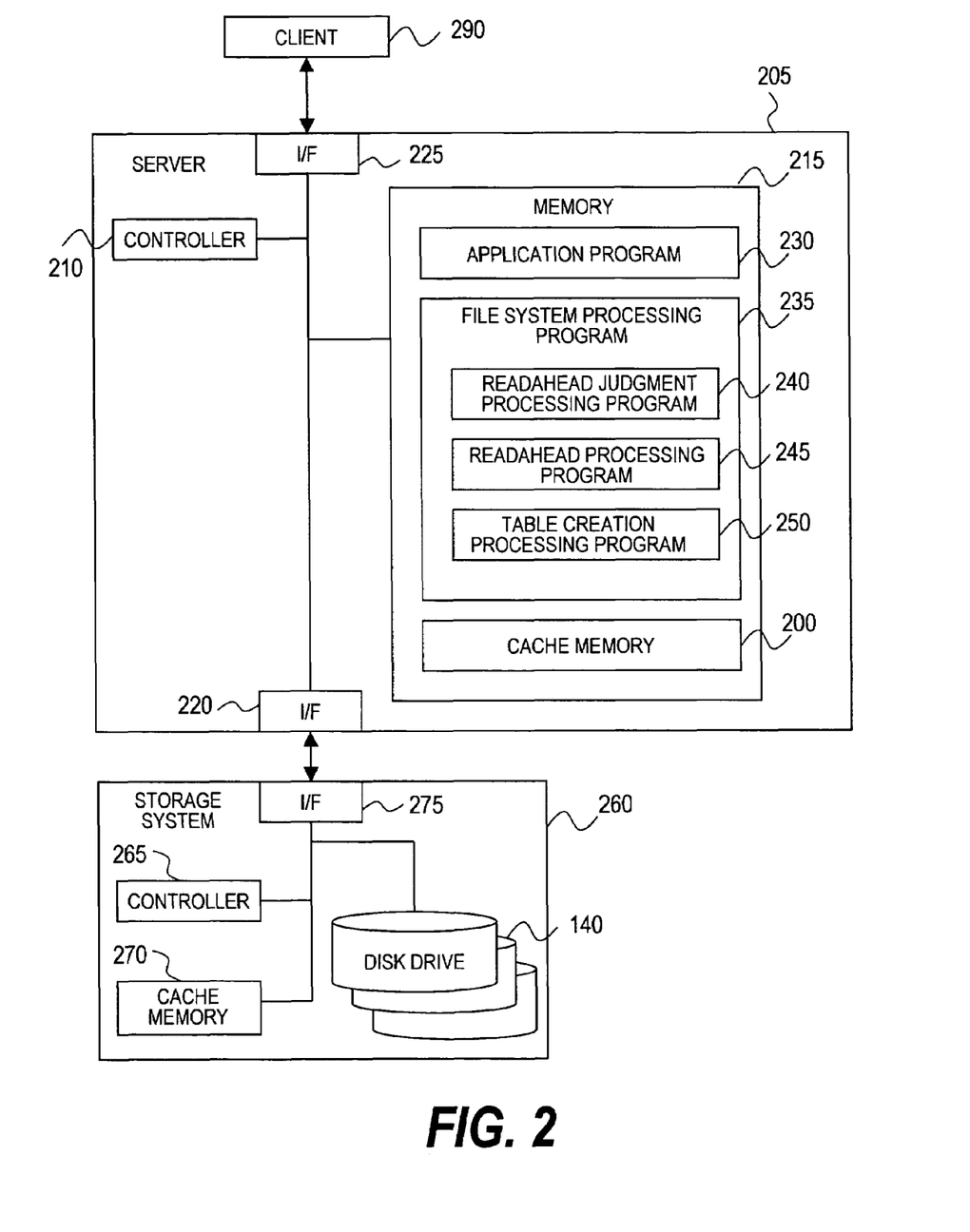
FIG. 2 is a configurational block diagram of the computer system according to the embodiment of this invention.

FIG. 2 is a configurational block diagram of the computer system according to the embodiment of this invention.

The computer system of FIG. 2 is composed of a client computer 290, a file server 205, and a storage system 260.

The client computer 290 is a computer that instructs the application 100 to perform file operation or the like.

The file server 205 is a computer that runs the application 100 and the file system 110. The file server 205 has a controller 210, a memory 215, an interface 220, and an interface 225.

The controller 210 executes a program stored in the memory 215, to thereby implement processing prescribed in the program. Specifically, the controller 210 executes an application program 230 to execute the application 100. The application 100 carries out a file operation request. The controller 210 executes a file system processing program 235 to execute the file system 110.

The file system processing program 235 contains a readahead judgment processing program 240, a readahead processing program 245 and a table creation processing program 250. These programs are executed by the controller 210 to implement the readahead judgment processing unit 130, the readahead processing unit 120 and the table creation processing unit 135, respectively.

The controller 210 uses an area of the memory 215 as the cache memory 200, and temporarily stores in the cache memory 200 data read out of the storage system 260 as well as data to be written in the storage system 260. The controller 210 exchanges data with the client computer 290 via the interface 220, and exchanges data with the storage system 260 via the interface 225.

Other computers than the file server 205 may carry out file operation requests. For instance, the computer system may be configured such that, when the application 100, run in the client computer 290 which is connected via the interface 225, receives a file operation request directed to the storage system 260, the file server 205 transfers the file operation request to the storage system 260 and sends a response from the storage system 260 to the client computer 290 via the interface 225.

The storage system 260 has a controller 265, a cache memory 270, an interface 275, and the disk drive 140. The controller 265 sends and receives data stored in the disk drive 140 in accordance with a request received through the interface 275. The disk drive 140 in the example of FIG. 2 is built from a disk array including plural magnetic disk drives.

Figure 3:
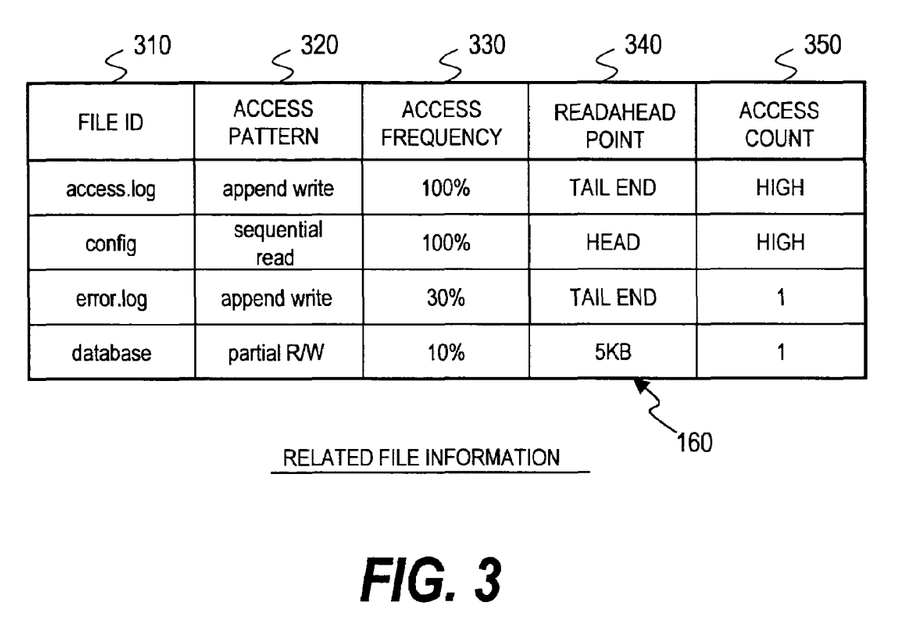
FIG. 3 is an explanatory diagram of an example of a related file information table according to the embodiment of this invention.

FIG. 3 is an explanatory diagram of an example of the related file information table 300 contained in the related file information 170 according to the embodiment of this invention.

The related file information table 300 holds information about a file that might be referred to immediately after the file 150.

The related file information table 300 is composed of entries each having a file ID 310, which indicates the identifier of the file that might be referred to, an access pattern 320 employed in referring to the file, an access frequency 330 at the time of the reference, a readahead point 340 of the file referred to, and an access count 350 of the file referred to.

The file ID 310 is information for uniquely identifying a file in the file system 110. A file name assigned in the file system 110 is used as the file ID 310. Information used as the file ID 310 is not limited to a file name, and a number unique to a file or a block number in a disk, for example, may be employed instead.

The access pattern 320 is information indicating what is requested in a file offset request. Specifically, the access pattern 320 is information made up of a combination of a file offset method and information indicating whether read or write is requested.

Examples of file offset methods include "sequential" in which areas successive to a specific point are processed, "partial" in which only a specific part is processed, "random" in which the file is read at plural points at random, and "append" in which data is appended to the tail end of the file.

Information indicating whether it is read or write that is requested can be "read", which indicates reading is to be executed, "write", which indicates writing is to be executed, and "R/W", which indicates reading and writing are both to be executed.

For instance, when the access pattern 320 is "append write", it indicates that data is to be appended to the tail end of the file. When the access pattern 320 is "partial R/W", it indicates that read and write are to be executed only in a specific part of the file.

The access frequency 330 is information indicating a frequency at which the file identified by the file ID 310 is referred to immediately after the file 150 requested by the application 100. A high value entered as the access frequency 330 indicates that there is a strong possibility of this file being referred to immediately after the file 150 requested by the application 100.

The readahead point 340 is information indicating which point in the file identified by the file ID 310 is referred to. When, for example, "append write" indicating appending is requested, data is to be attached to the tail end of the file and therefore "tail end" is recorded as the readahead point 304.

The access count 350 is information indicating how many times the file identified by the file ID 310 is referred to immediately after the file 150 requested by the application 100. In the case where the file is referred to immediately after the file 150 more than once, and many times, "high" is stored as the access count 350 whereas "1" is stored as the access count 350 in the case where the reference is made only once.

The file system 110 uses the access frequency 330 and the access count 350 to judge whether to read ahead data of the file assigned the file ID 310. Judging that readahead is to be carried out, the file system 110 uses the access pattern 320 and the readahead point 340 to determine the location and count of blocks in the disk drive 140 where readahead is executed.

Readahead processing will be described next.

Figure 4:
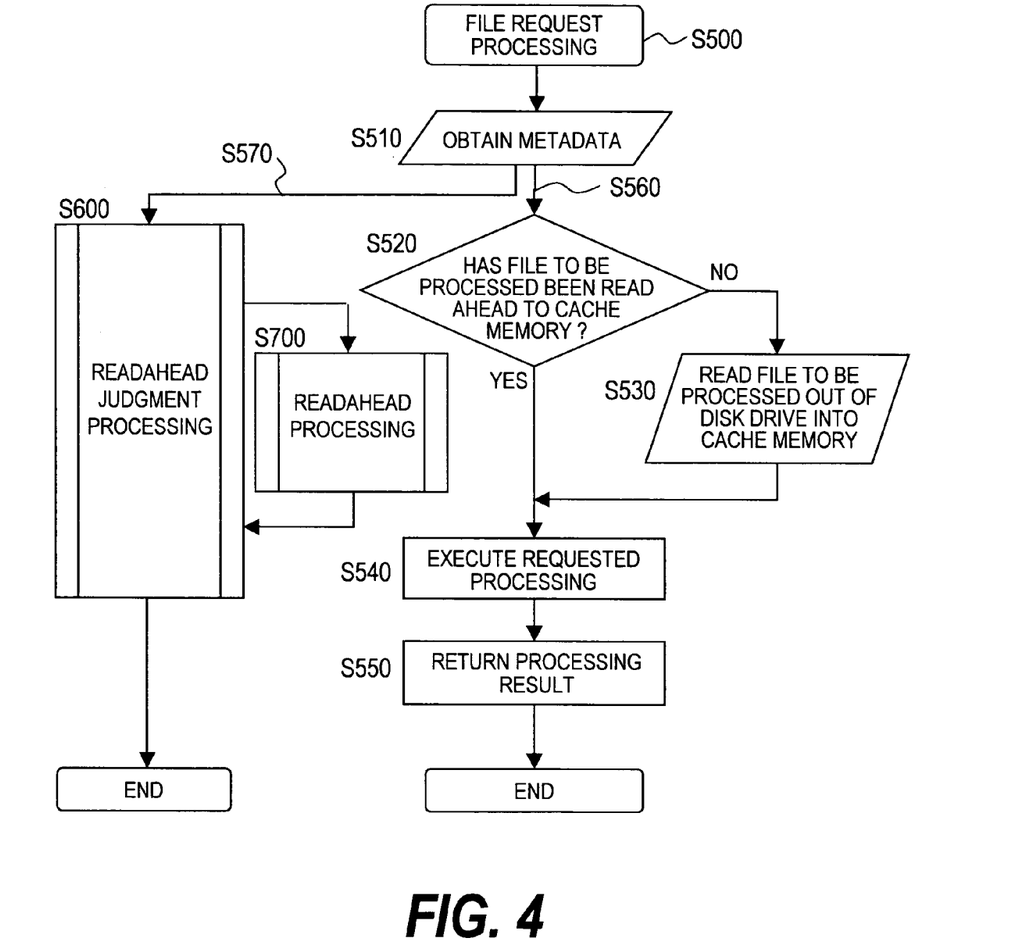
FIG. 4 is a flow chart of processing of a file system according to the embodiment of this invention.

FIG. 4 is a flow chart for processing executed by the file system 110.

The file system 110 waits for a file operation request from the application 100 and, receiving a file operation request 500, executes the processing of this flow chart (Step S500).

First, the file system 110 receives the file operation request 500 and obtains metadata of a file to be processed (Step S510). The file system 110 reads metadata stored in the disk drive 140 to obtain the metadata. In the case where metadata to be obtained is in the cache memory 200, the file system 110 obtains the metadata from the cache memory 200.

Next, the processing executed by the file system 110 is branched into a processing flow S560 for executing the received file operation request and a processing flow S570 for readahead. The processing flow 560 and the processing flow 570 are independent of each other, and accordingly can be executed by the file system 110 either concurrently or sequentially.

The processing flow S560 is a flow along which processing to meet the file operation request 500 is executed.

The file system 110 first checks the location of data to be processed. In other words, the file system 110 judges whether or not data to be processed is in the cache memory 200 (Step S520). When the data to be processed is not in the cache memory 200, the file system 110 reads the data to be processed out of the disk drive 140 into the cache memory 200 (Step S530), and moves to Step S540. When the data to be processed is in the cache memory 200, the file system 110 proceeds to Step S540 without executing the processing of Step S530.

In Step S540, the file system 110 executes data processing that fulfills the received file operation request. Specifically, the file system 110 executes file read/write, fetching of file configuration information, or the like. Finishing this processing, the file system 110 sends the result of executing Step S540 to the application 100 (Step S550), and ends the whole processing.

In the processing flow S570, the file system 110 has the readahead judgment processing unit 130 execute readahead judgment processing for judging whether to execute readahead of a related file (Step S600). When it is judged that the related file is to be read ahead, the processing branches into a processing flow S580 where the readahead processing unit 120 executes readahead processing (Step S700).

Figure 5:
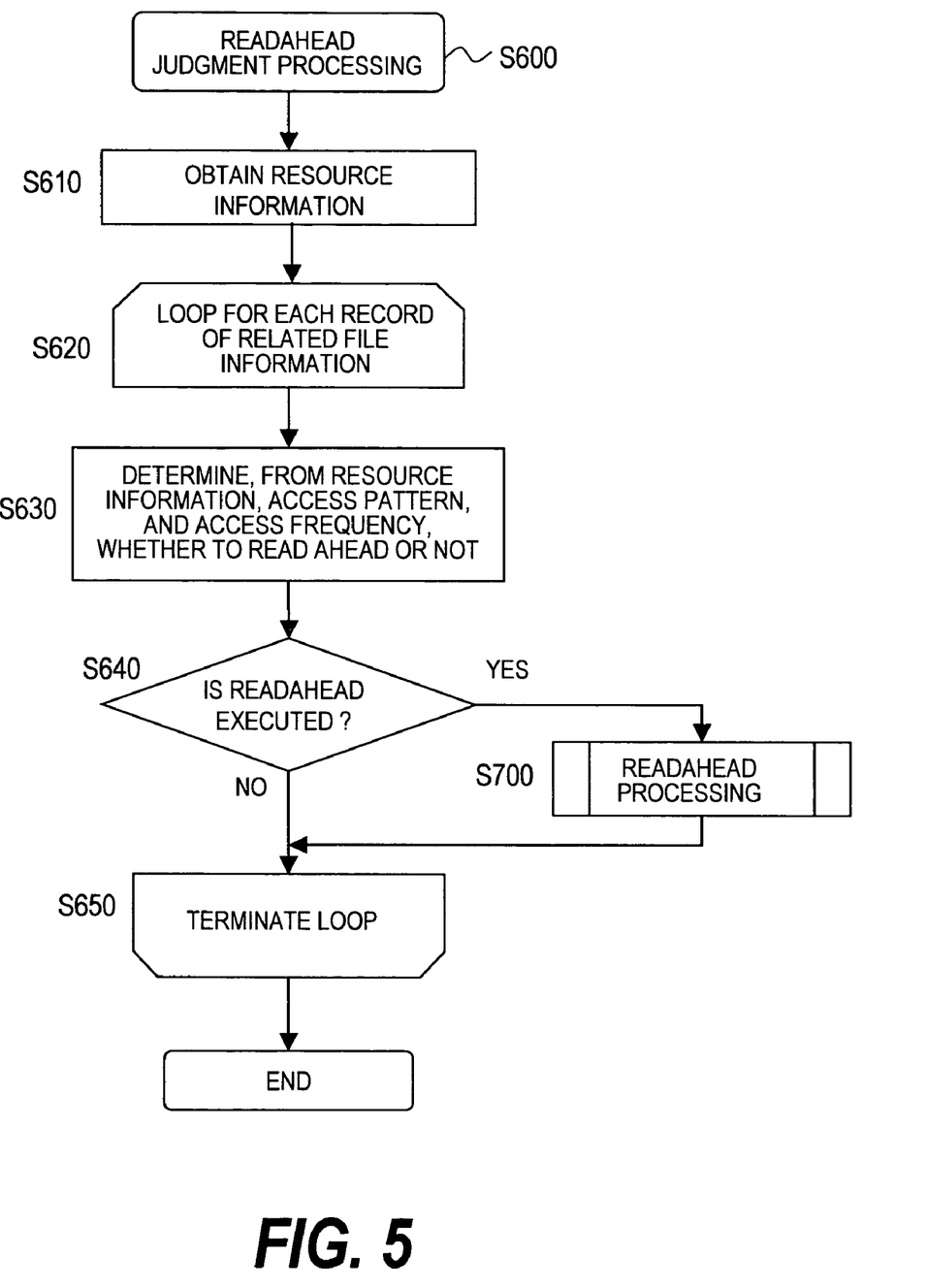
FIG. 5 is a flow chart of readahead judgment processing according to the embodiment of this invention.

FIG. 5 is a flow chart for readahead judgment processing.

In the processing flow S570, the readahead judgment processing unit 130 starts the readahead judgment processing (Step S600).

The readahead judgment processing unit 130 first obtains resource information (Step S610). Specifically, the information obtained is about resources used by the file system 110. The resource information contains the free capacity of the cache memory 200, the utilization ratios of the interfaces 225 and 220, the utilization ratio of the controller 210, and the like.

The readahead judgment processing unit 130 next repeatedly performs processing that begins from a loop head S620 and ends at a loop end S650 on each file information held in the related file information table 300 (Step S620).

First, in Step S630, the readahead judgment processing unit 130 judges whether to execute readahead of the file in question from the resource information obtained in Step S610 and from information on this file that the related file information table 300 provides.

For instance, the readahead judgment processing unit 130 always judges that readahead is to be executed for a file whose access frequency 330 is within a first given range (e.g., 80% or higher). A file whose access frequency 330 is within a second given range (e.g., equal to or higher than 30% and lower than 80%) is read ahead when the access count 350 is "high", or when the resource information shows that there is enough free capacity left in the cache memory 200. The readahead judgment processing unit 130 judges that readahead is not to be executed for a file whose access frequency 330 is within a third given range (e.g., equal to or higher than 0% and lower than 30%).

In this embodiment, "append write" and "partial write" are described as examples of the write requests for writing data in an area whose starting point and/or ending point dose not match with one of boundaries of the blocks in the disk drive.

Whether to execute readahead may be determined taking into account the utilization ratio of the controller 210 and the utilization ratios of the respective interfaces, in addition to the free capacity of the cache memory 200. For instance, readahead is not executed in deference to the processing load of the computer system when the utilization ratio of the controller 210 or the utilization ratios of the interfaces 220 and 225 are equal to or more than given values.

Judging that readahead of the file in question is to be executed, the readahead judgment processing unit 130 hands over the processing past the branching point S640 to the readahead processing unit 120 to execute readahead processing (Step S700).

The readahead judgment processing unit 130 finishes the processing for every file of which information is held in the related file information table 300 (Step S650), and then ends the readahead judgment processing.

Figure 6:
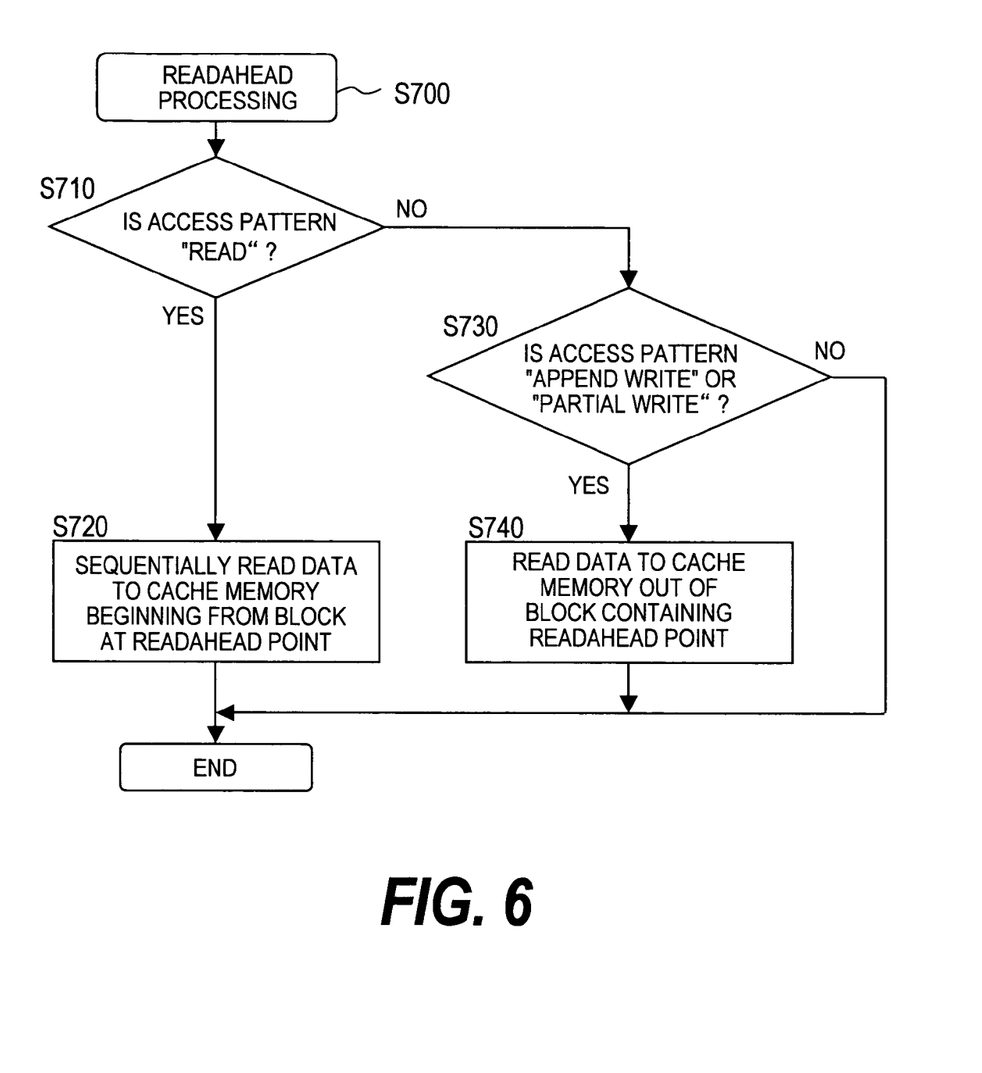
FIG. 6 is a flow chart of readahead processing according to the embodiment of this invention.

FIG. 6 is a flow chart for readahead processing.

When it is judged by the readahead judgment processing unit 130 that readahead is to be executed, the readahead processing unit 120 executes the readahead processing (Step S700).

First, the readahead processing unit 120 obtains from the related file information table 300 the access pattern 320 of the file to be read ahead. The readahead processing unit 120 judges whether or not the obtained access pattern 320 is "read", in other words, whether or not the file is accessed for reading (Step S710).

When the access pattern 320 is "read", the readahead processing unit 120 obtains from the related file information table 300 the readahead point 340 of the file to be read ahead. The readahead processing unit 120 then sequentially reads data out of the disk drive 140 into the cache memory 200 starting from a block that is indicated by the readahead point 340 (step S720).

When the access pattern 320 of the file to be read ahead is "append write" or "partial write", in other words, when the file is accessed for appending or partial writing, the readahead processing unit 120 obtains from the related file information table 300 the readahead point 340 of the file to be read ahead. The readahead processing unit 120 then reads data in a block in the disk drive 140 that contains the readahead point 340 into the cache memory 200 (Step S740).

The completion of the processing in Step S720 or Step S740 triggers the return to the flow chart for the readahead judgment processing. In the case where the access pattern 320 is none of those mentioned above, the readahead processing is immediately ended to return to the flow chart for the readahead judgment processing.

The processing described above enables the file system 110 to process a file contained in a file operation request, obtain a file that might be accessed immediately after access to the file requested to be processed, and store the obtained file in the cache memory 200 in advance. When it is a write request that is issued to the file accessed immediately after the file 150, the file read/write performance is particularly improved since data in a block that is specified by the write request is stored in the cache memory 200, and thus the convergence of access on the disk drive 140 is avoided even in such cases where some files are accessed repeatedly without much pause in between.

Described next is how the related file information table 300 is created. Methods of creating the related file information table 300 include one based on estimation from file contents and one based on a file access log.

Figure 7:
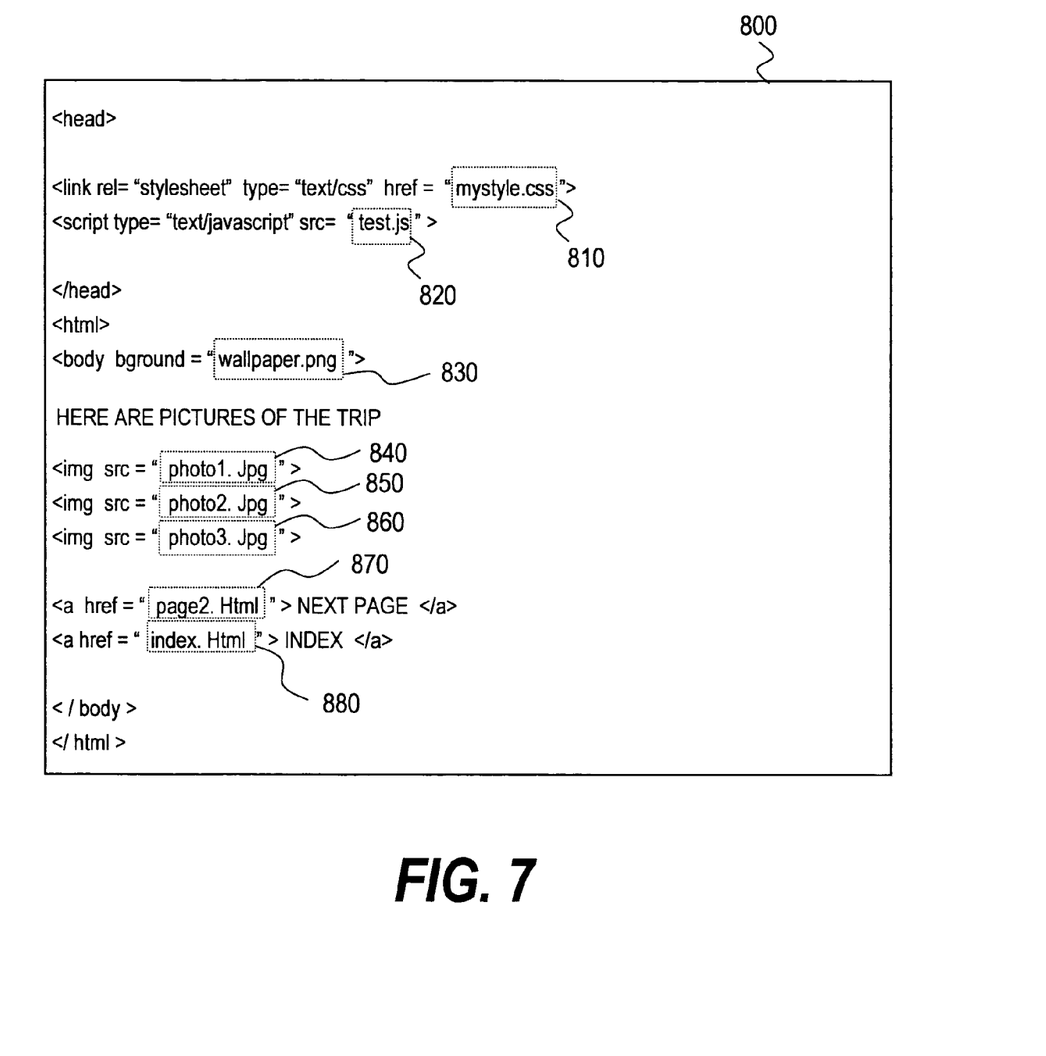
FIG. 7 is an explanatory diagram of an example of file contents according to the embodiment of this invention.
Figure 8:
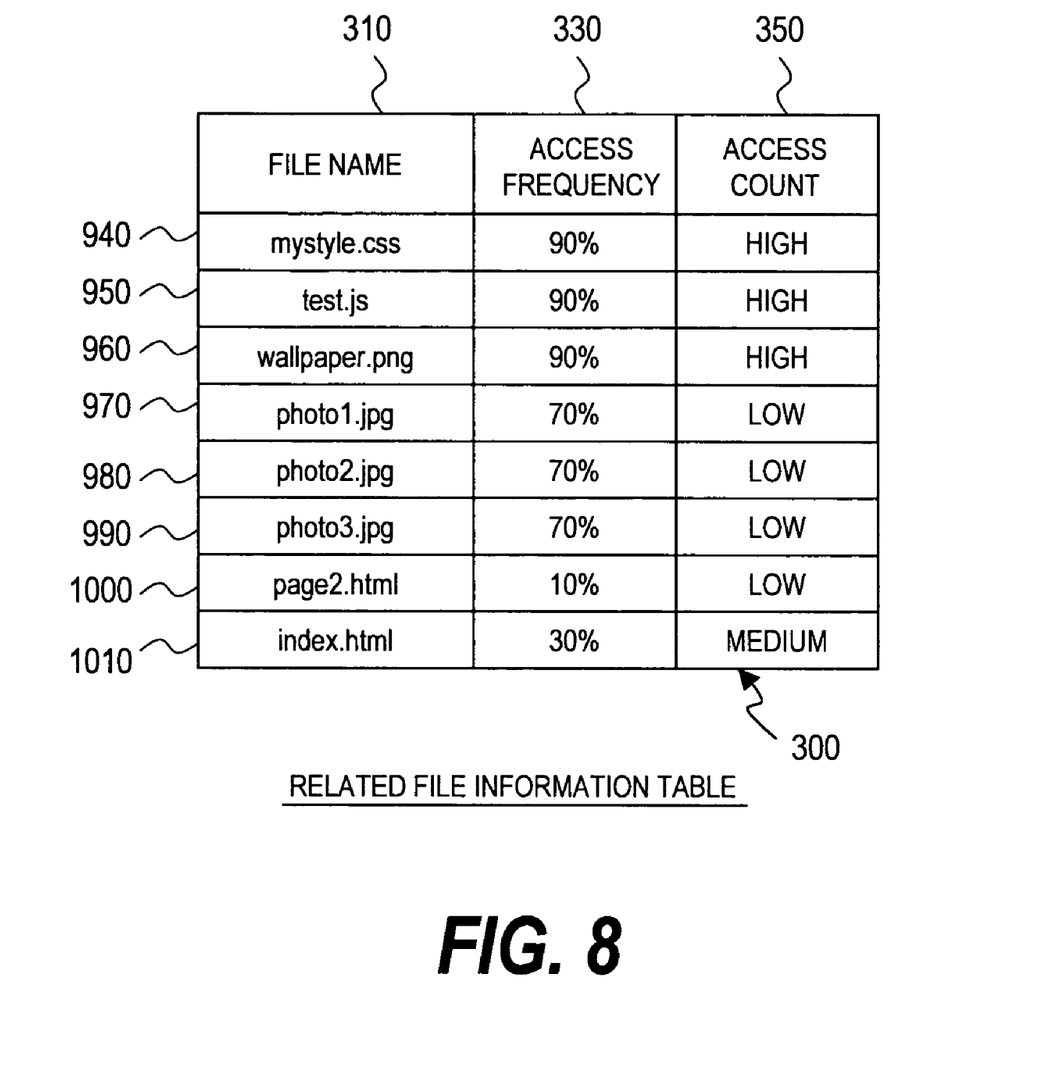
FIG. 8 is an explanatory diagram of an example of a related file information table created according to the embodiment of this invention.

FIG. 7 is an explanatory diagram showing an example of the contents of a file (an HTML file 800) for which the related file information table 300 is created, and FIG. 8 is an explanatory diagram showing an example of the related file information table 300 that is contained in metadata of this HTML file 800.

The HTML file 800 is read by the application 100 to be interpreted and displayed by a Web browser that is executed through processing of the application 100. The related file information table 300 is stored in metadata of the HTML file 800.

The HTML file 800 can refer to other file names with the use of tag. In the example of FIG. 7, a file name 810 is assigned to a file "mystyle. css", which describes display characteristics of the HTML file 800. A file name 820 is assigned to a file "test. js", which describes processing performed on the HTML file 800. A file name 830 is assigned to a file "wallpaper. png", which is used as a background image when the HTML file 800 is displayed. The Web browser executed through processing of the application 100 reads the HTML file 800 and interprets the contents of the file, which are followed immediately by reading of the files identified by the file names 810, 820, and 830.

There is a strong possibility that these files (the file names 810, 820, and 830) are read immediately after the HTML file 800. It can be surmised that these files have a fairly high access frequency. The table creation processing unit 135 of the file system 110 accordingly stores "90%", which is a considerably high access frequency, as the access frequency 330 in records of the related file information table 300 that hold the file names 810, 820, and 830 as shown in FIG. 8.

The HTML file 800 also contains file names 840, 850, and 860, which are assigned to image files. When set to display images, the Web browser displays the interpreted HTML file 800 and then immediately reads the files identified by the file names 840, 850, and 860.

There is a possibility that these files (the file names 840, 850, and 860) are read immediately after the HTML file 800. It can be surmised that these files have a rather high access frequency. The table creation processing unit 135 of the file system 110 accordingly stores "70%", which is a relatively high access frequency, as the access frequency 330 in records of the related file information table 300 that hold the file names 840, 850, and 860 as shown in FIG. 8.

The HTML file 800 also contains file names 870 and 880, which are assigned to link files. After displaying the interpreted HTML file 800, the Web browser reads these files if a user of the Web browser gives an instruction to do so.

There is a possibility that these files (the file names 870 and 880) are read immediately after the HTML file 800, but the possibility depends on users' utilization mode and on the Web site format. It can be surmised that these files have a rather low access frequency. The table creation processing unit 135 of the file system 110 accordingly stores "30%" and "10%", which are relatively low access frequencies, as the access frequency 330 in records of the related file information table 300 that hold the file names 870 and 880 as shown in FIG. 8.

Figure 9:
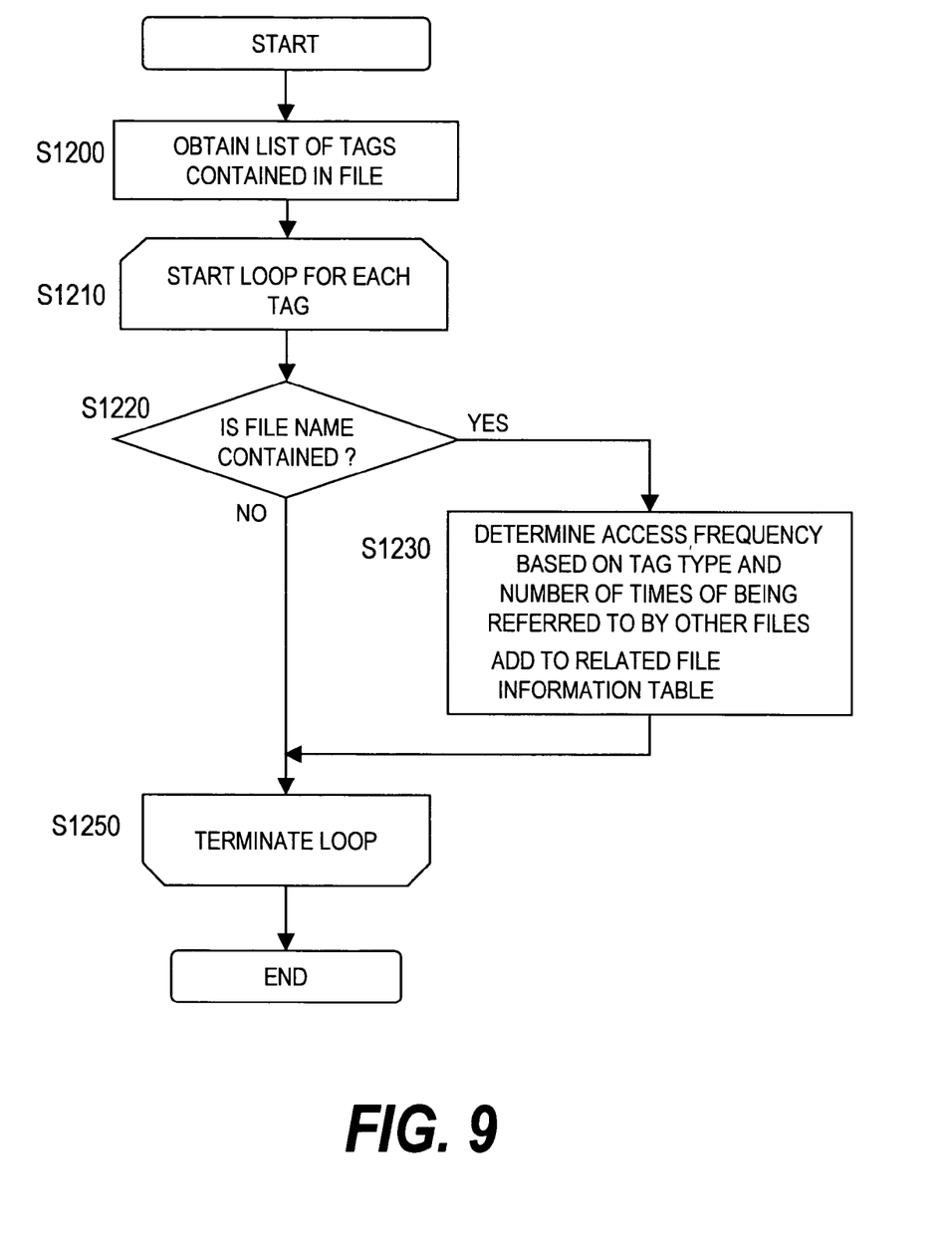
FIG. 9 is a flow chart of related file information creating processing according to the embodiment of this invention.

FIG. 9 is a flow chart for processing of creating related file information based on estimation of file contents.

The table creation processing unit 135 first refers to a file (here, an HTML file) for which related file information is created, and obtains a list of tags contained in this file (Step S1200). The table creation processing unit 135 then repeatedly performs a loop from Step S1210 to Step S1240 on each tag obtained.

In Step S1220, the table creation processing unit 135 judges whether or not a file name is contained in a tag that is being processed.

When a file name is contained in the tag that is being processed, the table creation processing unit 135 determines from the type of the tag the access pattern 320 and the readahead point 340. In the case where the tag type is "file offset", for example, the access pattern 320 is estimated as "sequential read" and the readahead point 340 is estimated as "head". In the case where the tag type indicates appending to a database file through CGI or the like, the access pattern 320 is estimated as "append write" and the readahead point 340 is estimated as "tail end". The table creation processing unit 135 also determines the access frequency 330 from the tag type and the number of times the file name contained in the tag is referred to by other files (Step S1230). For instance, when it is an IMG tag for displaying an image, the access frequency 330 is set high. The access frequency 330 is set low when it is an "A HREF tag" indicating a file that is not read until a user selects a link on the Web browser.

The table creation processing unit 135 then stores the file name 310, the access pattern 320, the access frequency 330, the readahead point 340 and the access count 350.

As described, data contained in a file, in particular, what operation is requested by the file when the file is an HTML file or the like that requests an operation of reading given files in succession, is obtained and a file name and an access frequency can be set as related file information from the obtained data.

A method of creating related file information from a file access log will be described next.

Figure 10:
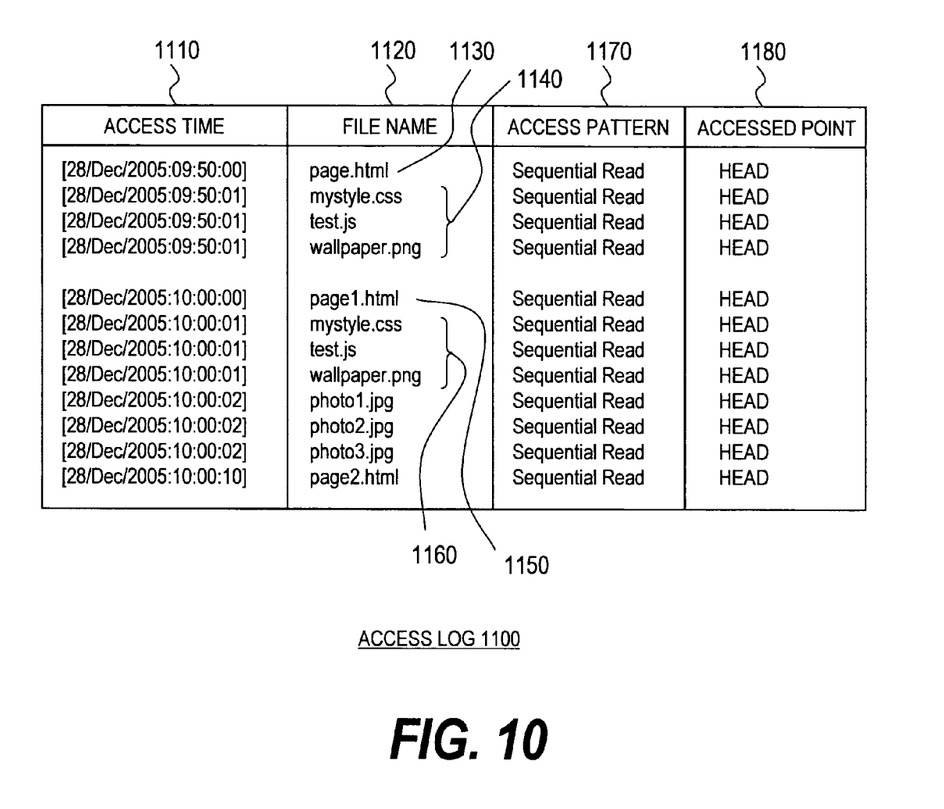
FIG. 10 is an explanatory diagram of an example of a file access log according to the embodiment of this invention.

FIG. 10 is an explanatory diagram of an example of a file access log 1100 in the file system 100.

The access log 1100 contains an access time 1110 and a file name 1120. In addition to the access time 1110 and the file name 1120, the access log 1100 may contain one or both of an access pattern 1170 and an accessed point (file offset) 1180. Stored as the access time 1110 is a time at which a file indicated by the file name 1120 is accessed. The access log 1100 is created by the file system 110 each time a file is referred to, and created logs are stored in order in a given area of the disk drive 140.

A close look at the access log 1100 of FIG. 10 shows that a file "page. html" assigned a file name 1130 and a file group assigned a file name 1140 ("mystyle. css", "test. js" and "wallpaper. png") have approximately the same access time. In this case, the file group having the file name 1140 can be judged as related files of the file having the file name 1130. The table creation processing unit 135 accordingly adds the file group having the file name 1140 to related file information of the file having the file name 1130. At this point, when the access log 1100 contains one or both of the access pattern 1170 and the accessed point 1180, the access pattern 1170 and the accessed point 1180 are stored as the access pattern 320 and readahead point 340 of the related file information 160.

In the case where access to a file group in which files constituting the group are accessed in the same order is recorded in the access log 1100 several times, the access frequency 330 of the file group may be set even higher.

In the example of FIG. 10, a file assigned a file name 1150 and a file group 1160 have approximately the same access time. File names included in the file group 1140 match file names included in the file group 1160 whereas the file name 1130 differs from the file name 1150. Estimated from this access log is that files included in the file group 1140 and the file group 1160 have a higher access frequency since the file group 1140 and the file group 1160 are accessed immediately after different files are accessed. Note that, although FIG. 10 shows an example in which the access pattern 1170 is set to "sequential read" and the access type 1180 to "head" without exception, there can be other access patterns and access types. When a file is referred to, the file system 110 stores in the access log 1100 the access pattern of the reference (e.g., "write", "read", "sequential", "partial" or "append") and the access type of the reference (e.g., "head", "tail end" or the location of data measured from the file head).

Figure 11:
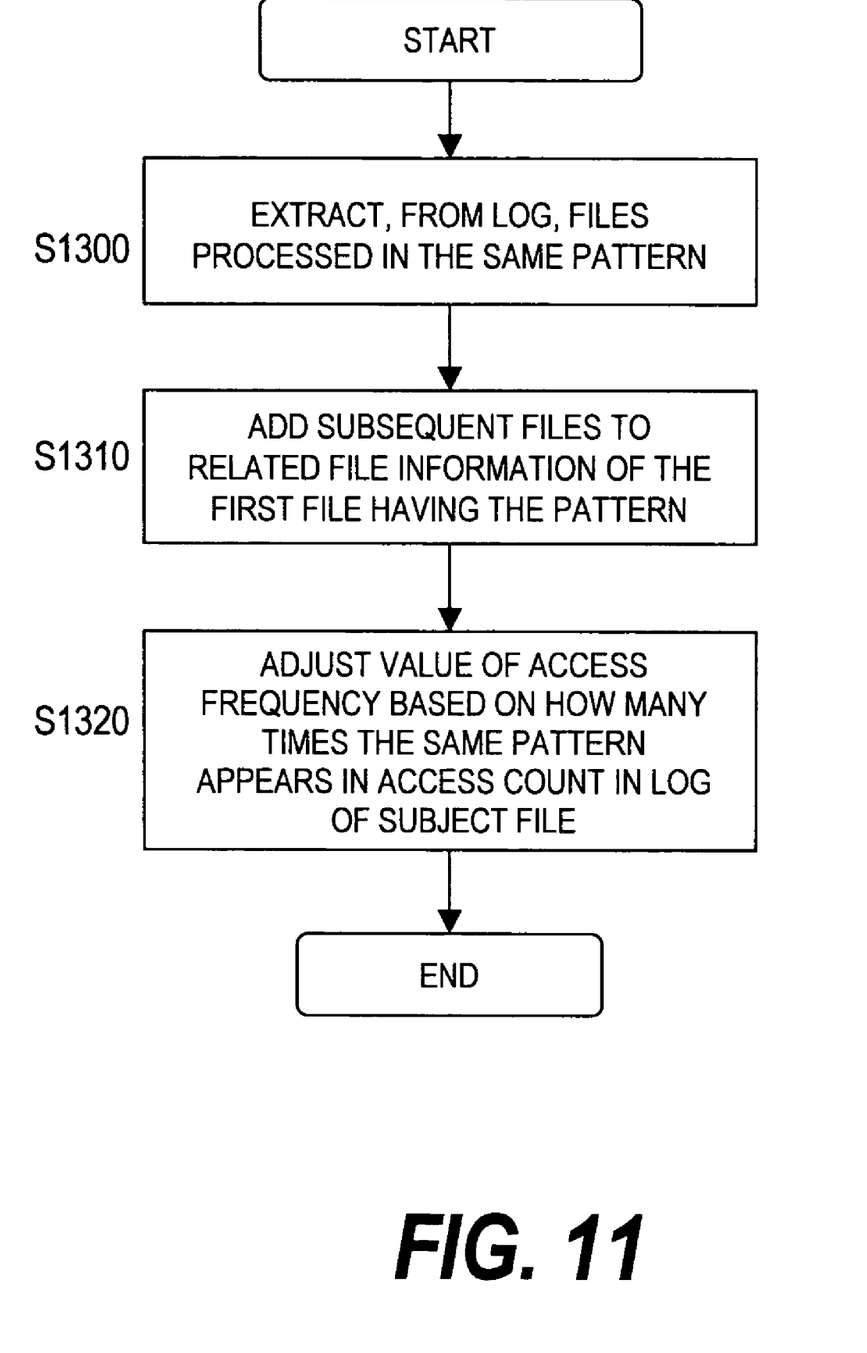
FIG. 11 is a flow chat of related file information creating processing according to the embodiment of this invention.

FIG. 11 is a flow chart for processing of creating related file information from a file access log.

The table creation processing unit 135 first extracts, from the access log 1100, file names or a file group that are processed in the same pattern as in the example of FIG. 9 described above (Step S1300).

The table creation processing unit 135 judges that the first file in the extracted pattern, namely, a file accessed immediately after the access time of a certain file, is a related file of the certain file, and stores information of the related file in the related file information 160 (Step S1310).

Next, the table creation processing unit 135 extracts how many times the same pattern appears, or the file access count. The extracted information is used to adjust the access frequency (Step S1320). For instance, when the same pattern appears many times, the access frequency is set high for files included in this pattern. When different patterns appear for the same file name, on the other hand, the access frequency is set low for file included in the patterns.

In this way, a pattern observed in a file access log is extracted and used to determine the access frequency as related file information.

The above-described flow chart of FIG. 9 is executed when a file is newly created or when a change is made to an existing file. The flow chart of FIG. 9 may also be executed when a file is accessed, when the processing load of the controller 210 is low, or at regular intervals. Similarly, the above-described flow chart of FIG. 11 is executed when a change is made to an existing file, when a file is accessed, when the processing load of the controller 210 is low, or at regular intervals.

While the present invention has been described in detail and pictorially in the accompanying drawings, the present invention is not limited to such detail but covers various obvious modifications and equivalent arrangements, which fall within the purview of the appended claims.

What is claimed is:

1. A file server, comprising:
a control unit;
a cache memory for temporarily storing data accessed by a client computer;
an interface coupled to the client computer; and
an interface coupled to a disk device,
wherein a plurality of files is stored in the disk device,
wherein a first file of the plurality of files contains metadata, which contains information that identifies the first file,
wherein the control unit incorporates, into the metadata, related file information,
wherein the related file information comprises:
information that identifies a second file, of the plurality of files, which is to be write-accessed in conjunction with access to the first file by the client computer;
an access type of the write access;
a location of a block in the disk device where the data in the second file, which is to be write-accessed, is stored;
frequency information indicating a frequency at which the second file is to be write-accessed after the first file is accessed; and
an access count indicating how many times the second file is referred to immediately after the first file,
wherein when the first file is accessed by the client computer, the control unit refers to the related file information to obtain the second file, the access type, the location of the block, the frequency information, and the access count,
wherein when the frequency information indicates that the frequency is within a first range, the control unit performs readahead processing by reading, from the obtained second file stored in the disk device, data in the obtained location of the block and corresponding to the obtained access type, and the control unit stores the read data in the cache memory,
wherein when the frequency information indicates that the frequency is within a second ranae and the access count exceeds a predetermined value, the control unit performs readahead processing by reading, from the obtained second file stored in the disk device, data in the obtained location of the block, and corresponding to the obtained access type, and the control unit stores the read data in the cache memory, wherein when the frequency information indicates that the frequency is within a third range, the control unit does not perform readahead processing of the second file, wherein the first range, the second ranae and the third range are exclusive of each other, wherein the access type is information representing one of an append write and a partial write, wherein, when the obtained access type represents the append write, the control unit reads data containing a tail end of the second file stored in the disk device to store the read data in the cache memory, and wherein, when the obtained access type represents the partial write, the control unit reads a data block containing a partial write point of the second file stored in the disk device to store the read data in the cache memory.

2. The file server according to claim 1, wherein the control unit is configured to:
obtain information that is contained in the first file and that refers to the second file when the first file is written in the disk device;
retrieve, from the obtained information, the second file and a type of reference made to the second file; and
create the frequency information based on a count of references made to the second file contained in the first file and the obtained type of reference.

3. The file server according to claim 1, wherein the control unit is configured to:
refer to an access log of the first file, which is stored in the disk device, to obtain the second file that has been accessed in conjunction with access to the first file and is contained in the access log; and
create the frequency information based on an access count of the second file, which is contained in the access log.

4. A computer system, comprising:
a client computer for accessing a plurality of files;
a disk device for storing the plurality of files; and a file server,
wherein the file server comprises:
a control unit;
a cache memory for temporarily storing data accessed by the client computer;
an interface coupled to the client computer; and
an interface coupled to the disk device,
wherein a first file of the plurality of files contains metadata, which contains information that identifies the first file,
wherein the control unit incorporates, into the metadata, related file information,
wherein the related file information comprises:
information that identifies a second file, of the plurality of files, which is to be write-accessed in conjunction with access to the first file by the client computer;
an access type of the write access;
a location of a block in the disk device where the data in the second file, which is to be write-accessed, is stored;
frequency information indicating a frequency at which the second file is to be write-accessed after the first file is accessed; and
an access count indicating how many times the second file is referred to immediately after the first file,
wherein when the first file is accessed by the client computer, the control unit refers to the related file information to obtain the second file, the access type, the location of the block, the frequency information, and the access count, wherein when the frequency information indicates that the frequency is within a first range, the control unit performs readahead processing by reading, from the obtained second file stored in the disk device, data in the obtained location of the block, and corresponding to the obtained access type, and the control unit stores the read data in the cache memory, wherein when the frequency information indicates that the frequency is within a second range and the access count exceeds a predetermined value, the control unit performs readahead processing by reading, from the obtained second file stored in the disk device, data in the obtained location of the block, and corresponding to the obtained access type, and the control unit stores the read data in the cache memory, wherein when the frequency information indicates that the frequency is within a third range, the control unit does not perform readahead processing of the second file, wherein the first range, the second ranae and the third range are exclusive of each other, wherein the access type is information representing one of an append write and a partial write, wherein, when the obtained access type represents the append write, the control unit reads data containing a tail end of the second file stored in the disk device to store the read data in the cache memory, and wherein, when the obtained access tyPe represents the append write, the control unit reads a data block containing a partial write point of the second file stored in the disk device to store the read data in the cache memory.

5. The computer system according to claim 4, wherein the control unit is configured to:
obtain information that is contained in the first file and that refers to the second file when the first file is written in the disk device;
retrieve, from the obtained information, the second file and a type of reference made to the second file; and
create the frequency information based on a count of references made to the second file contained in the first file and the obtained type of reference.

6. The computer system according to claim 4, wherein the control unit is configured to:
refer to an access log of the first file, which is stored in the disk device, to obtain the second file that has been accessed in conjunction with access to the first file and is contained in the access log; and
create the frequency information based on an access count of the second file, which is contained in the access log.

7. A file readahead method, which is executed by a file server, wherein the file server comprises a control unit, a cache memory for temporarily storing data accessed by the client computer, an interface coupled to the client computer, and an interface coupled to the disk device, wherein a plurality of files is stored in the disk device, wherein a first file of the plurality of files contains metadata, which contains information that identifies the first file, the method comprising:
incorporating, into the metadata, related file information, wherein the related file information comprises information that identifies a second file, of the plurality of files, which is to be write-accessed in conjunction with access to the first file by the client computer, an access type of the write access, a location of a block in the disk device where the data in the second file, which is to be write-accessed, is stored, frequency information indicating a frequency at which the second file is to be write-accessed after the first file is accessed, and an access count indicating how many times the second file is referred to immediately after the first file;

obtaining, when the first file is accessed by the client computer, the second file, the access type, the location of the block, the frequency information, and the access count, by referring to the related file information;

performing readahead processing by reading, from the obtained second file stored in the disk device, data in the obtained location of the block, and corresponding to the obtained access type, when the frequency information indicates that the frequency is within a first range, and storing the read data in the cache memory;

performing readahead processing by reading, from the obtained second file stored in the disk device, data in the obtained location of the block, and corresponding to the obtained access type, when the frequency information indicates that the frequency is within a second range and the access count exceeds a predetermined value, and storing the read data in the cache memory, wherein when the frequency information indicates that the frequency is within a third range, a step of performing readahead processing of the second file is not performed, wherein the first range, the second ranae and the third ranae are exclusive of each other, wherein the access type is information representing one of an append write and a partial write, wherein, when the obtained access type represents the append write, the control unit reads data containing a tail end of the second file stored in the disk device to store the read data in the cache memory, and wherein, when the obtained access type represents the partial write, the control unit reads a data block containing a partial write point of the second file stored in the disk device to store the read data in the cache memory.

8. The file readahead method according to claim 7, further comprising:

obtaining information that is contained in the first file and that refers to the second file when the first file is written in the disk device;

retrieving, from the obtained information, the second file and a type of reference made to the second file; and creating the frequency information based on a count of references made to the second file contained in the first file and the obtained type of reference.

9. The file readahead method according to claim 7, further comprising:

referring to an access log of the first file, which is stored in the disk device, to obtain the second file that has been accessed in conjunction with access to the first file and is contained in the access log; and creating the frequency information based on an access count of the second file, which is contained in the access log.

* * * * *